US006652687B2

(12) United States Patent
Shiraishi

(10) Patent No.: US 6,652,687 B2
(45) **Date of Patent: *Nov. 25, 2003**

(54) SINGLE DRUM TYPE HEAT-SENSITIVE ADHESIVE ACTIVATING LABELER, AND CONTINUOUS LABEL STICKING METHOD USING THE LABELER

(75) Inventor: Tsugihiro Shiraishi, Saitama (JP)

(73) Assignee: Sanseiseiki Co., Ltd., Saitama (JP)

( * ) Notice: Subject to any disclaimer, the term of this patent is extended or adjusted under 35 U.S.C. 154(b) by 101 days.

This patent is subject to a terminal disclaimer.

(21) Appl. No.: 09/960,987

(22) Filed: Sep. 25, 2001

(65) Prior Publication Data

US 2002/0043322 A1 Apr. 18, 2002

(51) Int. Cl.[7] .......... B32B 31/20

(52) U.S. Cl. .......... 156/64; 156/270; 156/285; 156/378; 156/521; 156/542; 156/568; 156/567

(58) Field of Search .......... 156/64, 363, 362, 156/361, 353, 567, 568, 566, DIG. 8, DIG. 9, DIG. 10, DIG. 11, 542, 541, 497, 521, 380.9, 270, 285, 378

(56) References Cited

U.S. PATENT DOCUMENTS 4,589,945 A * 5/1986 Polit .......... 156/497
5,061,334 A * 10/1991 Paules .......... 156/235
6,328,832 B1 * 12/2001 Otruba et al. .......... 156/64
6,401,787 B1 * 6/2002 Tsutsumi et al. .......... 156/542
6,450,227 B1 * 9/2002 Labardi .......... 156/351

FOREIGN PATENT DOCUMENTS

GB 2188608 A * 10/1987

* cited by examiner

*Primary Examiner*—Curtis Mayes
*Assistant Examiner*—George R. Koch, III
(74) *Attorney, Agent, or Firm*—Rader, Fishman & Grauer PLLC

(57) ABSTRACT

The labeler of this invention is a single drum labeler that comprises a label adhering drum having label suction holes disposed at equal intervals in odd number of places of the peripheral surface of the drum, and a closing rod freely detachably entered from an open hole to close an unnecessary label suction hole. A feeder feeds an article, to which the label piece is adhered, in synchronization with the label sucked to the label suction hole of every other position. A pressing device presses the fed-in article to the adhering drum and adhering the label. A heat-sensitive adhesive activation device is disposed substantially around the drum opposite to a drum surface along the peripheral edge of the label adhering drum.

16 Claims, 11 Drawing Sheets

SINGLE DRUM TYPE HEAT-SENSITIVE ADHESIVE ACTIVATING LABELER, AND CONTINUOUS LABEL STICKING METHOD USING THE LABELER

TECHNICAL FIELD OF THE INVENTION

This invention relates to a labeler for adhering a heat-sensitive label to a label adhered body.

BACKGROUND OF THE INVENTION

A conventional labeler for adhering a heat-sensitive label or label piece to a container or the like was designed to hold the label by sucking an adhesive surface of the label with a suction hole formed onto a suction drum after the label was cut into a specified size, and to have a necessary item printed on its outside surface opposite to the adhesive surface. Then the print was checked and, after a label piece with printing failure was removed, the printed surface of the label was sucked by a suction hole of an adhering drum, reversing the label and holding the printing surface, instead of the adhesive surface. The outside adhesive surface of the label was then activated, and the label was adhered onto a container or the like.

In other words, the adhering drum needed to suck and hold the label having its adhesive side face outside to activate the adhesive surface.

Therefore, since printing process could not be carried out on the adhering drum, two drums, namely, the sucking drum was used for sucking and holding the adhesive surface of the label, and then to print something on the printing surface of the label, and the adhering drum was used for adhering the label onto a container or the like after printing.

In addition, labels in various sizes are available, which are used according to purposes of use. Suction holes of an adhering drum must be covered with a label when the label is sucked by the adhering drum of the labeler. The suction holes are composed of a group of holes disposed on the drum. However, since pressure is not reduced if there is any suction hole not covered with the label, the label cannot be sucked.

Thus, at present, a plurality of adhering drums having suction hole groups matching a label size are prepared, and a adhering drum of the labeler is changed to another when a label size is changed.

In addition, for continuous adhering of labels, adhesive of the labels needed to be activated immediately before press-adhering labels. Thus, an activation device was necessary to be installed in the vicinity of a press-adhering device. The drum is enlarged because the label is fed to the suction hole in the vicinity of the activation device, the label is not sucked in the suction hole between a label adhering portion and a label-feeding portion, becoming a useless part in the process. Such is a drawback of the prior art.

The inventors conducted studies in order to reduce the number of drums to one, and presented a single drum type heat-sensitive adhesive activating labeler in Japanese Patent Application No. 11-43612. This invention is extremely advantageous, but the activation device installed in the peripheral surface of a drum was not disposed on the full peripheral surface.

SUMMARY OF THE INVENTION

In order to solve the problem in the earlier technology, the present invention provides a single drum labeler constructed in such a manner that the number of drums is set to be one, without using a suction drum. Label adhering speed is increased by providing an activation device on a full periphery excluding the label feeding portion and the label press-adhering portion of a adhering drum to make an activation region long, and label pieces of different sizes can be processed with one drum by reducing the diameter of the adhering drum, and closing a suction hole according to a label size to adjust an sucking surface. A label adhering method using the labeler is also provided to solve the problem.

This invention relates to a single drum type heat-sensitive adhesive activating labeler. The labeler comprises a label sheet; a printer for printing a necessary item on a surface opposite to an adhesive surface of the label sheet; a feed roll for feeding a label piece to a suction hole of every other position of label suction holes of a adhering drum provided before the printer; and a label sheet cutter disposed at a position where at least a tip of a cut label piece provided before the roll is brought into contact with the suction hole of the adhering drum. Next to the cutter, a label adhering drum is provided. The label adhering drum comprises a drum having label suction holes disposed at equal intervals in an odd number of places of a peripheral surface of the drum and having a ventilation hole, one end of which is opened to a top surface and the other end connected to a pressure reducing device, the communication hole and the label suction holes being communicated with each other. The label adhering drum further comprises a closing rod freely detachably inserted into an open hole bored in the top surface of the label adhering drum to close an unnecessary label suction hole. The labeler of this invention further comprises a feeder that feeds an article, to which a label is adhered, in synchronization with a label sucked to a label suction hole of every other position; a pressing device, provided in a position opposite to a drum disposed before the cutter, to press the fed-in article to the adhering drum and adhere a label by rotation of the drum; and a heat-sensitive adhesive activation device disposed along periphery of the drum except for the positions where the drum sucks the label oppositely to the drum surface along a peripheral edge of the label adhering drum and where the article is pressed to the adhering drum and the label is adhered thereto.

A single drum type heat-sensitive adhesive activating labeler of this invention may comprise the label suction hole disposed on the drum that is a suction hole formed with a group of suction holes. Further, the label sheet cutter above may include a latch and a cutting blade disposed in the vicinity of a suction hole at a rear part of the suction hole group of the adhering drum when viewed from a rolling direction of the drum. Furthermore, the label sheet cutter may include a rotary blade and a rotary roller provided proximity to the adhering drum and being opposite to each other sandwiching a label sheet.

The label suction holes of the labeler of the invention disposed in the odd number of places on the peripheral surface of the drum may include wide suction part for sucking large labels.

The closing rod freely of the labeler of this invention, detachably inserted into the open hole bored in the top surface of the adhering drum to close the unnecessary label suction hole may have a length reaching a suction hole of a lowermost layer from the open hole bored in the top surface. Particularly, the closing rod may have a head large enough not to be inserted into the open hole bored in the top surface. The closing rod may further include an adjusting portion for adjusting length of insertion from the open hole bored in the top surface. The closing rod may be a hollow one, and may include a through-hole formed in the closing rod wall at a place where the through-hole meets with a suction hole, and an end opening of the hollow part of the closing rod is communicated with a ventilation path.

The closing rod may include a plurality of through-holes at the locations that meets with suction holes having a size suited to a label size in another surface of the rod wall.

A decompressing device connected to label suction holes of the drum may stop suction operation at a stage when the label is adhered onto the fed-in article pressed to the adhering drum by means of rotation of the drum.

The heat-sensitive adhesive activation device may be a far-infrared ray heater adapted to activate heat-sensitive adhesive of the label by means of radiant heat of far-infrared rays without contact.

The pressing device may include an arc-shaped pressing member provided along a drum peripheral surface to guide the fed-in article to the adhering drum and press the article by rotation of the drum. Further, the labeler may include a printing failed label adhered article detecting and discharging device in a position of an advancing direction from the pressing device.

In addition, this invention relates to a continuous label adhering method by a single drum type heat-sensitive adhesive activating labeler. The method includes steps of: sucking a label at a label suction hole of a single drum type heat-sensitive adhesive activating labeler; activating adhesive by a heat-sensitive adhesive activation device; adhering the label onto an article fed in by a pressing device; rotating the label suction hole once or one turn without sucking a label piece; returning the label suction hole to a label sucking position to suck another label; activating adhesive by the heat-sensitive adhesive activation device again; pasting the label onto another article fed in by the pressing device; and repeating the steps.

PREFERRED EMBODIMENTS OF THE INVENTION

Figure 1:
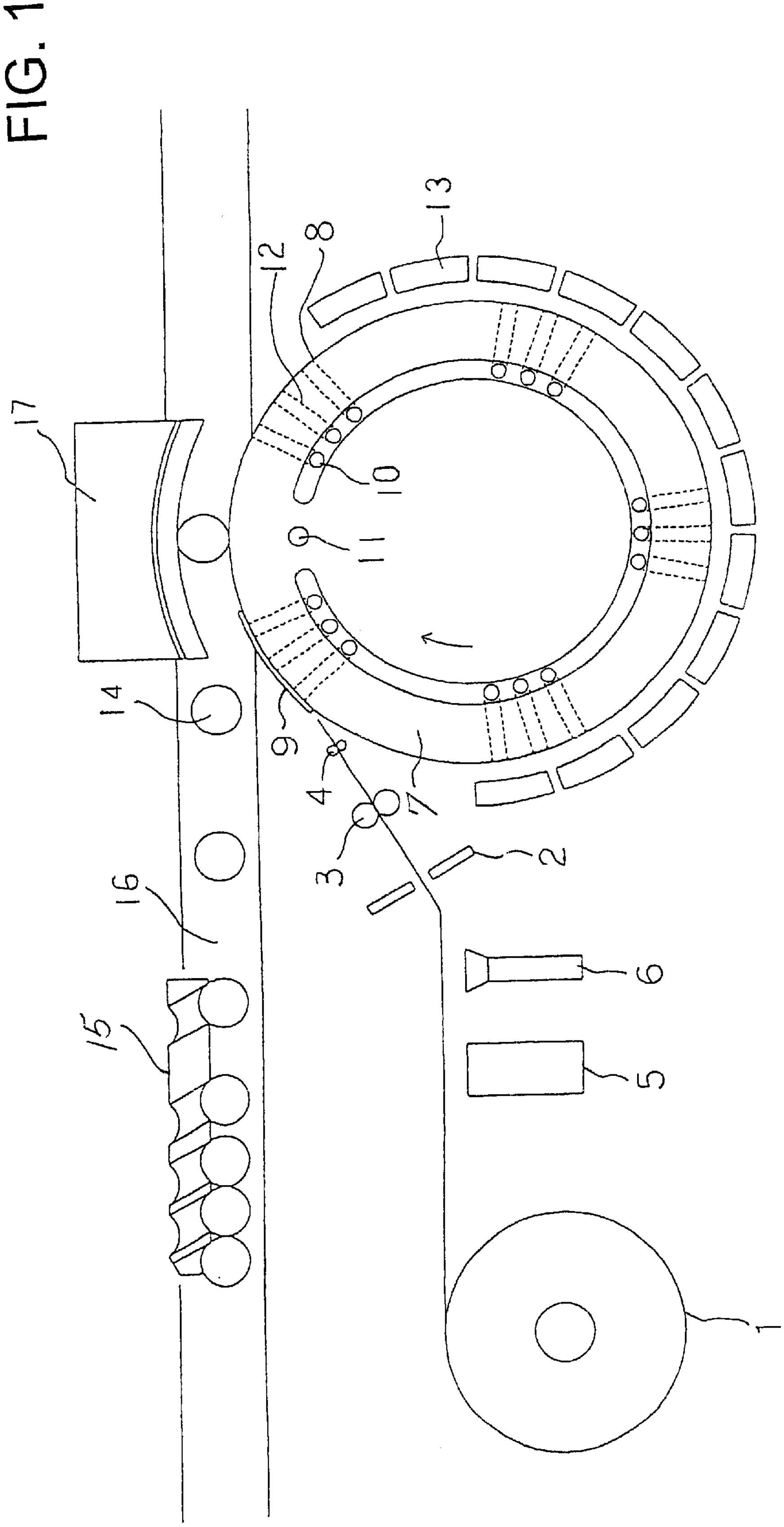
FIG. 1 is a view illustrating a labeler of the present invention.

In the present invention, there are arranged, in the vicinity of a label press-adhering device of a label adhering drum, (a) a label sheet; (b) a printer for printing a necessary item on a surface of the label opposite to its adhesive surface; (c) a feed roll for feeding a label to a suction hole of every other positions of label suction holes of the adhering drum provided in front of the printer; and (d) a label sheet cutter disposed in front of the roll, in which at least a tip of a cut label piece is provided before the roll is brought into contact with the suction hole of the adhering drum. The printer is arranged at this position so that the print quality of a label forwarded by the drum to this position can conveniently and easily be confirmed visually by an operator.

Furthermore, there are arranged (e) a label adhering drum including a drum and a closing rod, wherein, the drum is disposed next to the cutter, and has label suction holes disposed with equal intervals in an odd number of places of a peripheral surface of the drum, a ventilation hole having one end opened to a top surface of the drum and the other end connected to a decompresser device is included in the drum, and the ventilation hole and the label suction holes are communicated with each other, and wherein the closing rod is freely and detachably inserted into the opening of the ventilation hole at the top surface to close an unnecessary label suction hole; (f) a feeder for feeding an article, to which a label is adhered, in synchronization with a label sucked to a label suction hole of every other positions; (g)

a pressing device provided in front of the cutter opposite to the drum to press the fed-in article onto the adhering drum and to adhere a label to the article by means of rotation of the drum; and (h) a heat-sensitive adhesive activation device disposed along periphery of the drum except for the positions where the drum sucks the label oppositely to the drum surface along a peripheral edge of the label adhering drum and where the article is pressed to the adhering drum and the label is adhered thereto.

According to the present invention, the suction drum is not used. Conventionally, the opposite surface of an adhesive surface of a label has to be sucked to activate the adhesive. Thus, it has been considered that any necessary items cannot be printed on the surface of a label opposite to the adhesive surface thereof without a suction drum.

According to the present invention, however, the suction drum become unnecessary, by printing something necessary by a printer onto a surface of a label opposite to a adhesive surface before the label reaches a adhering drum, forwarding the label toward the adhering drum, and cutting the label with a cutter arrayed with the adhering drum on the same plane, and then cut into label pieces by the cutter near or at the adhering drum. Thus, the suction drum is made unnecessary. The cutter must be positioned at a place where at least the front end, seen from the feeding direction of the cut label, of the label piece is brought into contact with the suction hole of the adhering drum. Otherwise, the cut label piece is not sucked on the adhering drum.

The label adhering drum includes label suction holes arranged at equal intervals on the peripheral surface. Regarding the label suction holes, preferably, a plurality of holes are provided rather than just one, and the group of suction holes distributed in an area matching the size of the label is formed. The suction holes are arranged at equal intervals on the drum peripheral surface and, for this arrangement, an odd number of places of the arrangement is necessary to continuously discharge articles having adhered labels.

Each suction hole is connected to a ventilation path extended in the axial direction of the drum, and the ventilation path is connected to a decompressing device. A most typical decompressing device is a vacuum pump.

A label fed to the adhering drum is sucked by the suction holes and covers the holes. The label then passes through a heating activation zone in accordance with rotation of the drum, and, upon activation of the adhesive, is pressed and adhered to an article.

When a label adhering process is started and progresses in a regular running state, a first suction hole at a label sucking part of the suction drum sucks a label or a label piece and advances, while a second suction hole does not suck any label, and advances. A third label suction hole sucks a label piece, and advances. In short, an odd number of suction holes suck a label skipping one suction hole in each time. Then, the advanced and activated first label is pressed and adhered onto an article, to which the label is to be adhered. Then, another label is fed to a second suction hole advanced next to the first label suction hole, and the second suction hole sucks the label piece and advances. Since the adhesive of the label piece sucked by the second suction hole has not been activated yet, adhering process is carried out yet. For the third suction hole of a next position, adhering process is carried out because the label sucked by the third suction hole has already been activated. A label feed roller is controlled to feed labels to every other suction holes and to have every other label pieces sucked by the suction holes, activated and adhered. An article feeding device also feeds an article, to which a label is adhered, to a pressing device according to the positions of every other suction holes, in synchronous with the feeding interval of the labels fed to every other suction holes.

Since the label feeding part is disposed in the vicinity of the adhering part as described above, the heat-sensitive adhesive activation device can be arranged along the peripheral surface of the drum except for the positions of the label feeding part and the pressing device, and the label sucked to the suction hole quickly enters into the activation device, and its activation is started. In addition, because of the long activation region, processing speed can be increased. Since the process speed of a heat-sensitive labeler depends on length of time necessary for adhesive activation, the rotational speed of the drum can be increased if the activation region is formed along substantially full peripheral surface of the adhering drum as described above. As a result, it is possible to increase an adhering speed. Another advantage provided is the capability of minimizing the drum.

For the cutter installed in a position near the adhering drum, one having a rotary blade and an anvil (patch rotary roller) sandwiching a label sheet is used. For the cutter installed on the adhering drum, one having a patch provided in the vicinity of a suction hole in the rear part of the adhering drum, a cutting blade, and so on, is used. Thus, a necessary item is printed on a label sheet (label) and, for each label piece formed by cutting the label, the surface of the label piece opposite to its adhesive surface is sucked to the suction hole of the adhering drum and held.

The label adhering drum of the labeler includes suction holes for sucking a label, arranged in the circumferential side face of the drum. The suction hole is distributed in an area matching the size of a label to be sucked. Each suction hole is connected to a ventilation path extended in the axial direction of the drum, and the ventilation path is connected to the decompressing device. A most typical decompressing device is a vacuum pump.

The label fed to the adhering drum is sucked by a suction hole, while covering the suction hole, is forwarded, through the heating activation zone, by rotating the drum, to have the label pressed and adhered to the article.

The adhering drum of the present invention is comprised with a manner that a ventilation path having one end opened at a top surface of the drum and the other end connected to the decompressing device is provided in the adhering drum. The ventilation path is connected to the suction holes, an unnecessary suction hole that does not suck any labels, among the suction holes connected to the ventilation path, is closed by inserting a closing rod into the opening of the ventilation path, and the distribution of the suction holes is adjusted depending on a label.

The closing of the unnecessary suction hole is advantageous in that adhering process can be carried out for labels of any sizes with one adhering drum that includes suction holes distributed in the suction area for a largest label having maximum area size.

According to the present invention, since the closing of the unnecessary suction hole can be carried out while the adhering drum is arranged in the labeler, it is not necessary to remove the drum.

Preferably, the closing rod may include a head part protruded outside of the ventilation path opening of a top surface, for convenience of insertion and removal, and the length thereof may reach a lowest layer of the suction hole.

A plurality of closing rods having different lengths may be provided, each of the lengths of which may be one between the top surface of the drum and each of the locations of suction holes in the same number of the suction holes. Alternatively, a closing rod may have the length reaching the suction hole of the lowermost layer and may have an insertion length adjusting part, making it possible to use one kind of closing rod. For the adjusting part of the closing rod, an adjusting hole at a location that matches with a distance between the suction hole and the drum top surface may be provided and, by inserting a stop pin into the adjusting hole, the insertion length may be adjusted to close the suction hole with one rod. The insertion distance may also be adjusted by engaging the ventilation path and a closing rod with a screw. The area of a suction surface may be adjusted by using a hollow closing rod, providing through-holes in a linear manner at positions matching the suction holes. The several combinations of through-holes may be disposed in the rod walls according to the size of the labels. The area of suction surface may be adjusted by inserting the closing rod of this kind into the ventilation opening, and by communicating the hollow part with the ventilation path, for matching the through-hole matching the size of the label. For convenience of explanation, the ventilation path opening was provided in the top surface of the adhering drum. However, the ventilation path opening may be provided in a surface opposite to the top surface of the adhering drum, and the closing rod may be inserted from this surface. Alternatively, such ventilation path openings may be provided in both surfaces, and the closing rod may be inserted into the both openings.

The closing rod is inserted from a ventilation path opening into the ventilation path. However, since no force is applied to pull out the closing rod during the operation of the adhering drum, engagement of the closing rod can be made by setting the diameter of the rod slightly smaller than that of each of the ventilation path opening and the ventilation path thereby increasing contact friction, and having the closing rod slipped in. Needless to say, fixing means, such as screwing with the ventilation path opening, may be used.

Apparently, the presence of the ventilation path opening in the drum top surface is advantageous in that, since the head part of the closing rod is prevented from being protruded to the drum peripheral surface having the suction holes arranged when the closing rod is inserted, the label sucking surface is not affected at all.

If the suction holes are closed by inserting the closing rods at the peripheral surface of the adhering drum, the peripheral surface of the drum becomes irregular or bumpy, adversely affecting the fixing result of a label onto a container. Besides, the rotation of the drum gives rise to a centrifugal force, creating the possibility of pulling-out of the closing rod from the suction hole, necessitating firm fixing. This situation is not preferable.

The heat-sensitive adhesive activation device of the present invention disposed opposite to the peripheral edge of the adhering drum surface is adapted to activate heat-sensitive adhesive by heating. Suitable heating may be provided by means of, such as, hot air heating or heating by a halogen lamp. For example, a near-infrared ray heating device may also be used.

However, in the case of hot air heating, there are many problems including noise, the discharging of a large amount of generated hot air, low heating efficiency, and so on. On the other hand, in the case of heating by a halogen lamp, since the ratio of thermal absorption by paper is very low, from 1 to 40%, within the wavelength range of near-infrared ray generated by the halogen lamp, it was not suitable for a high-speed labeler. Since a base material for the labeler is paper, a low thermal absorption ratio requires longer time for activating the heat-sensitive adhesive and is not suitable.

A most preferable heat-sensitive adhesive activation device is a far-infrared ray radiation heater.

The heater provided opposite to the outer periphery of the adhering drum should preferably be installed to surround the outer periphery of the drum excluding the label adsorption portion and the press-adhering portion, for better adhesive activation and faster label adhering speed.

For a far-infrared ray radiation heater, a ceramic far-infrared ray heater that is commercially available may be one, which converts the wave length of heat ray generated by a heat generator into that of far-infrared ray with a ceramic layer and radiates the far-infrared ray. Specifically, a metallic thin strip is used as a heat generator, and by providing a ceramic layer on the surface thereof and supplying electricity, far-infrared rays are radiated.

A far-infrared ray radiation heater may be provided to an adhering drum. In this case, a ceramic layer is provided in the outer peripheral surface of the adhering drum, an inductive heating coil is disposed inside the drum, far-infrared ray may be radiated from the ceramic layer by supplying electricity and heating the drum, and the adhesive of the heat-sensitive label may be activated.

Needless to say, both heaters may be provided side by side.

Regarding ceramics for radiating far-infrared rays, for example, a far-infrared ray heating system by NGK Insulators Ltd. or the like may be used.

A far-infrared ray radiation heater is useful because far-infrared rays with a wavelength of 2.5 $\mu$m to 25 $\mu$m that are emitted by a far-infrared ray radiation heater exhibit about 80% thermal absorption ratio for paper, and therefore the heater is very suitable for heating an article, such as a label using paper as a base material, and the heat-sensitive adhesive can be activated within a short period of time. This heater is much better compared with the case of near-infrared ray radiation where thermal absorption ratio for paper is about 1 to 40%.

A label having activated adhesive is forwarded, by a rotating adhering drum, to a position to where an article, to which the label is to be adhered, is fed. The article is pressed onto the adhering drum by a pressing device, and the label is adhered thereto while the article is rotated. For the pressing device, a publicly known device may be used. As for an easy one, a pressing device having an arc-shaped pressing guide or a pressing roll along an adhering drum surface is preferred.

Even though it is less effective, a near-infrared ray heater may be used.

Next, the necessity of disposing odd number of label suction holes at equal intervals will be described in detail.

Figure 12:
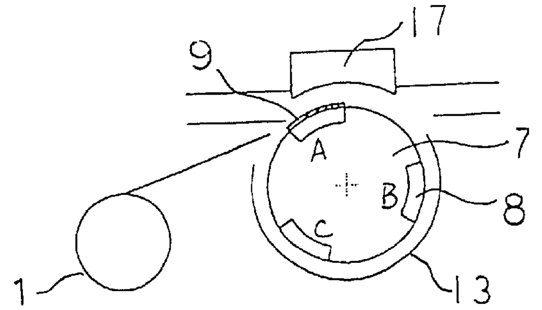
FIG. 12 is a view illustrating a progress in an adhering step of the labeler of the present invention.

Each of FIGS. 12 to 17 is a view illustrating the operation of the labeler of the present invention. In the drawing, a suction drum, a label, an activation device, and a pressing device necessary for the explanation are schematically shown, and others are omitted. In FIG. 12, a reference numeral 1 denotes a label sheet wound in a roll shape; 7 is a label suction drum; 8 is a suction hole, such suction holes being disposed in positions equally distributed to the three places of A, B and C in this example; 9 denotes a label piece sucked by a suction hole; 13 denotes an activation device; and 17 denotes a pressing device. No label piece is sucked to by the suction holes B and C. Since a label or label piece sucked by a suction hole is not adhered to an article unless it is activated, the label cannot be adhered unless the drum is rotated once.

Figure 13:
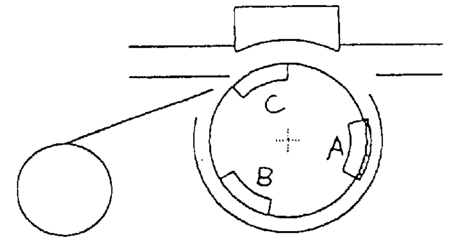
FIG. 13 is a view illustrating a progress in the adhering step of the labeler of the present invention.

In FIG. 13, the drum is rotated, and the label sucked by the suction hole A enters into the activation region. The label is not fed although the suction hole C enters into the label suction region, and the drum is forwarded without a label being sucked.

Figure 14:
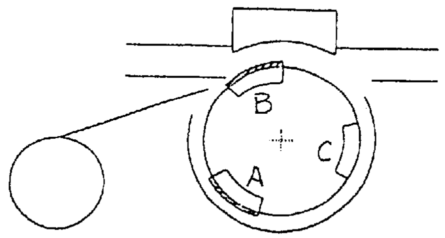
FIG. 14 is a view illustrating a progress in the adhering step of the labeler of the present invention.

In FIG. 14, the drum is still rotated, and another label is fed to the suction hole B. The suction hole C enters into the activation region while no label is sucked. The suction hole A is forwarded while activating the sucked label.

Figure 15:
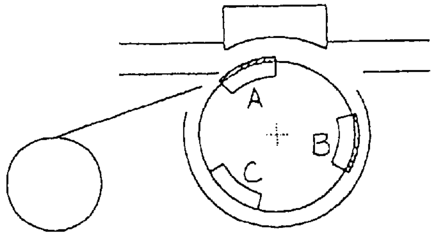
FIG. 15 is a view illustrating a progress in the adhering step of the labeler of the present invention.

In FIG. 15, the drum is rotated, the suction hole A having an activated label adhered enters into the press-adhering region to adhere the label to an article, to which the label is to be adhered. The suction hole B that has the label sucked enters into the activation region. The suction hole C is forwarded without having a label.

Figure 16:
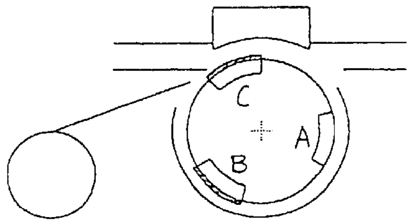
FIG. 16 is a view illustrating a progress in the adhering step of the labeler of the present invention.

In FIG. 16, the label is fed to the suction hole C. The suction hole B that has the label sucked is forwarded while having the label activated. The suction hole A that has not sucked a label enters into the activation region.

Figure 17:
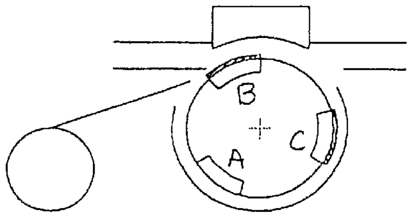
FIG. 17 is a view illustrating a progress in the adhering step of the labeler.

In FIG. 17, the suction hole B that has the activated label enters into the press-adhering region, and adheres the label onto an article to which the label is to be adhered. The suction hole C that has the sucked label enters into the activation region to have the label activated. The suction hole A that has not sucked a label is forwarded as it is.

Figure 18:
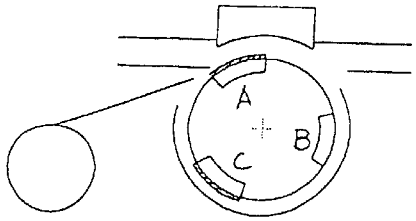
FIG. 18 is a view illustrating a progress in the adhering step of the present invention.

In FIG. 18, the suction hole B that has adhered the label onto an article enters into the activation region without having a label. The label is fed to the suction hole A. The label of the suction hole C is continuously forwarded while being activated.

Figure 19:
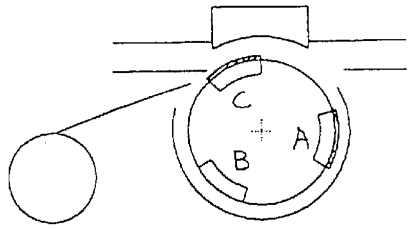
FIG. 19 is a view illustrating a progress in the adhering step of the present invention.

In FIG. 19, the suction hole C that has the activated label enters into the press-adhering region, and adheres the label onto an article to which the label is to be adhered. The suction hole A that has the label sucked enters into the activation region, and the suction hole B that does not have a label is forwarded as it is.

As described above, each of the labels is adhered onto an article as shown in FIGS. 15, 17 and 19, such adhering is carried out for every other suction hole.

As apparent from the running state of label adhering process shown in FIGS. 12 to 19, an odd number of suction holes are disposed at equal intervals on the drum, and articles each having a label adhered thereto are continuously discharged at equal intervals, while a label is sucked by every other suction hole, and is activated and adhered onto the article.

For comparison, a case where an even number of suction holes are arranged at equal intervals in the drum periphery is shown in FIGS. 20 to 25. Only a drum is shown for simplification.

Figure 20:
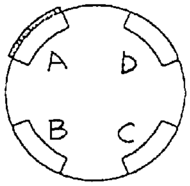
FIG. 20 is a view illustrating a progress in an adhering step of a comparative labeler.

A label is fed to the suction hole of A of FIG. 20, and then sucked. No other labels have been sucked yet by the suction holes B to D.

Figure 21:
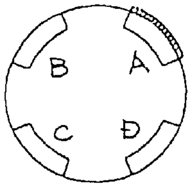
FIG. 21 is a view illustrating a progress in the adhering step of the comparative labeler.

The suction hole A having the label sucked thereon enters into the activation region as shown in FIG. 21. A label is not fed to the suction hole B.

Figure 22:
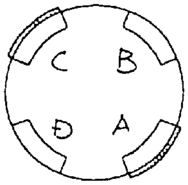
FIG. 22 is a view illustrating a progress in the adhering step of the comparative labeler.

In FIG. 22, a label is fed to the suction hole C. The label sucked by the suction hole A is forwarded while being activated. There are no labels sucked by the suction holes B and D.

Figure 23:
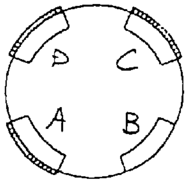
FIG. 23 is a view illustrating a progress in the adhering step of the comparative labeler.

In FIG. 23, a label is fed to the suction hole D. The label of the suction hole C enters into the activation region.

Figure 24:
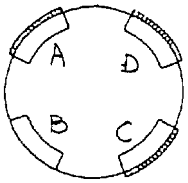
FIG. 24 is a view illustrating a progress in the adhering step of the comparative labeler.

In FIG. 24, the label of the suction hole A is pressed and adhered or pasted onto an article. The labels of the suction holes D and C are forwarded while being activated.

Figure 25:
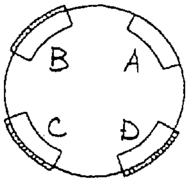
FIG. 25 is a view illustrating a progress in the adhering step of the comparative labeler.

In FIG. 25, a label is fed to the suction hole B. The labels of the suction holes C and D are forwarded while being activated. The suction hole A does not have a label.

Figure 26:
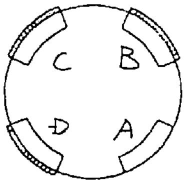
FIG. 26 is a view illustrating a progress in the adhering step of the comparative labeler.

In FIG. 26, the label of the suction hole C is adhered. There are no labels in the suction hole A.

Figure 27:
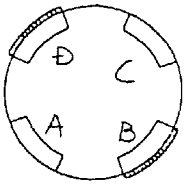
FIG. 27 is a view illustrating a progress in the adhering step of the comparative labeler.

In FIG. 27, the label of the suction hole D is adhered. The suction holes A and C do not have a label.

Figure 28:
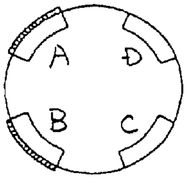
FIG. 28 is a view illustrating a progress in the adhering step of the comparative labeler.

In FIG. 28, a label is fed to the suction hole A. The suction holes C and D do not have a label.

Figure 29:
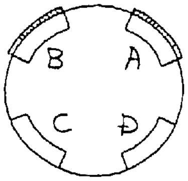
FIG. 29 is a view illustrating a progress in the adhering step of the comparative labeler.

In FIG. 29, the label of the suction hole B is adhered. The suction holes C and D do not have a label.

Figure 30:
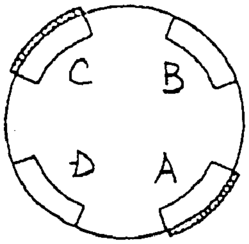
FIG. 30 is a view illustrating a progress in the adhering step of the comparative labeler.

In FIG. 30, a label is fed to the suction hole C. The label of the suction hole A is activated and advanced.

Figure 31:
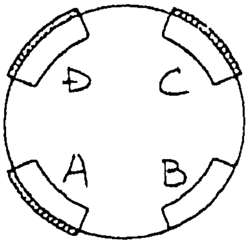
FIG. 31 is a view illustrating a progress in the adhering step of the comparative labeler.

In FIG. 31, a label is fed to the suction hole D.

Figure 32:
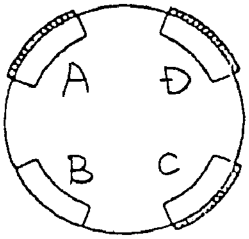
FIG. 32 is a view illustrating a progress in the adhering step of the comparative labeler.

In FIG. 32, the label of the suction hole A is adhered. Thus, label adhering process is carried out at the points shown in FIGS. 24, 26, 27, 29, and 32, while no adhering process is carried out once between the points shown in FIGS. 24 and 26. At the points shown in FIGS. 26 and 27, continuous label adhering process is carried out. No adhering process is carried out once between the points shown in FIGS. 27 and 29. No adhering process is carried out twice between the points shown in FIGS. 29 and 32.

Thus, the articles having labels adhered thereto are not discharged at an equal interval.

Apparently, when four suction holes are distributed at equal intervals, the articles having labels are not discharged for every other suction hole, but discharged alternately, continuously for twice, alternately again, and alternately skipping two suction holes, which process is repeated. Consequently, the articles are not discharged at an equal interval.

In any case, when the even number of label suction holes are distributed at equal intervals on the drum, the articles having adhered labels are not discharged for every other suction hole. For labeling process management, it is extremely important that articles having labels adhered thereto are discharged uniformly at a regular interval.

Thus, according to the present invention, an odd number of suction holes are formed on the peripheral surface of the adhering drum at an equal interval.

According to the present invention, labels are sucked alternately on the odd number of suction holes provided on the peripheral surface of the adhering drum. If the labels are sucked by all of the suction holes, the labels are activated, all the labels are continuously adhered, and the articles are discharged continuously. However, for the next round, no adhering process may be carried out until the drum makes another one round rotation. Consequently, the discharge process for articles having adhered labels includes repetition of continuous discharge and long-term intermittent non-discharge, and makes it difficult to perform process management.

EXAMPLES

Next, the specific example of the present invention will be described.

FIG. 1 is a plan view specifically showing the single drum type heat-sensitive adhesive activating labeler of the present invention. A reference numeral 1 denotes a heat-sensitive label sheet, which includes a reading mark for cutting by a fixed size. Numeral 5 denotes a printer for printing a necessary item on the surface of the label sheet. Numeral 2 denotes a reader that reads a cut mark printed on the label sheet. Upon reading the mark, the reader 2 sends a signal to a label sheet feed roller 3. Then the label sheet is cut into a fixed size by a label cutter 4. Numeral 6 denotes an inspection unit for inspecting contents printed by the printer 5. Numeral 7 denotes a label adhering drum. Numeral 8 denotes a label suction hole radially provided on the peripheral surface of the drum 7 corresponding to the label size. The suction holes 8 are provided according to a maximum size of a label used. In this case, a group of suction holes provided corresponding to a label having maximum size is regarded as one place. Particularly, five groups of suction holes are provided in this example, while an odd number of groups of suction holes are generally provided in the labeler of the present invention. Numeral 9 denotes a label sucked to the suction holes. Numeral 10 denotes a ventilation path on the top surface of the drum 7 opened in a vertical direction, and communicated with a suction hole. Numeral 11 denotes an opening/closing port communicated with a switch valve installed between the port and a vacuum pump. The operation of the switch valve for label suction becomes in the suction mode when the label is sucked to the suction holes and fed into a heat-sensitive adhesive activating zone. The label is activated while the adhesive is laid for one round in the adhesive activating zone, and the opening/closing port 11 becomes in the open mode at a point where it encounters an article 14, to which a label is adhered. Numeral 12 denotes a communication path for communicating the suction hole with the vacuum pump. The numeral 13 denotes a far-infrared ray heater for activating the adhesive surface of the backside of the label. Numeral 16 denotes a conveyer for carrying the article 14 to which a label is adhered. Numeral 15 denotes a feeder for feeding articles 14 to which labels are adhered, at a predetermined pitch, such articles being fed alternately in synchronization with the labels sucked to the odd number of groups of suction holes 8 provided in the outer periphery of the label adhering drum. Numeral 17 denotes a press-adhering device.

Figure 2:
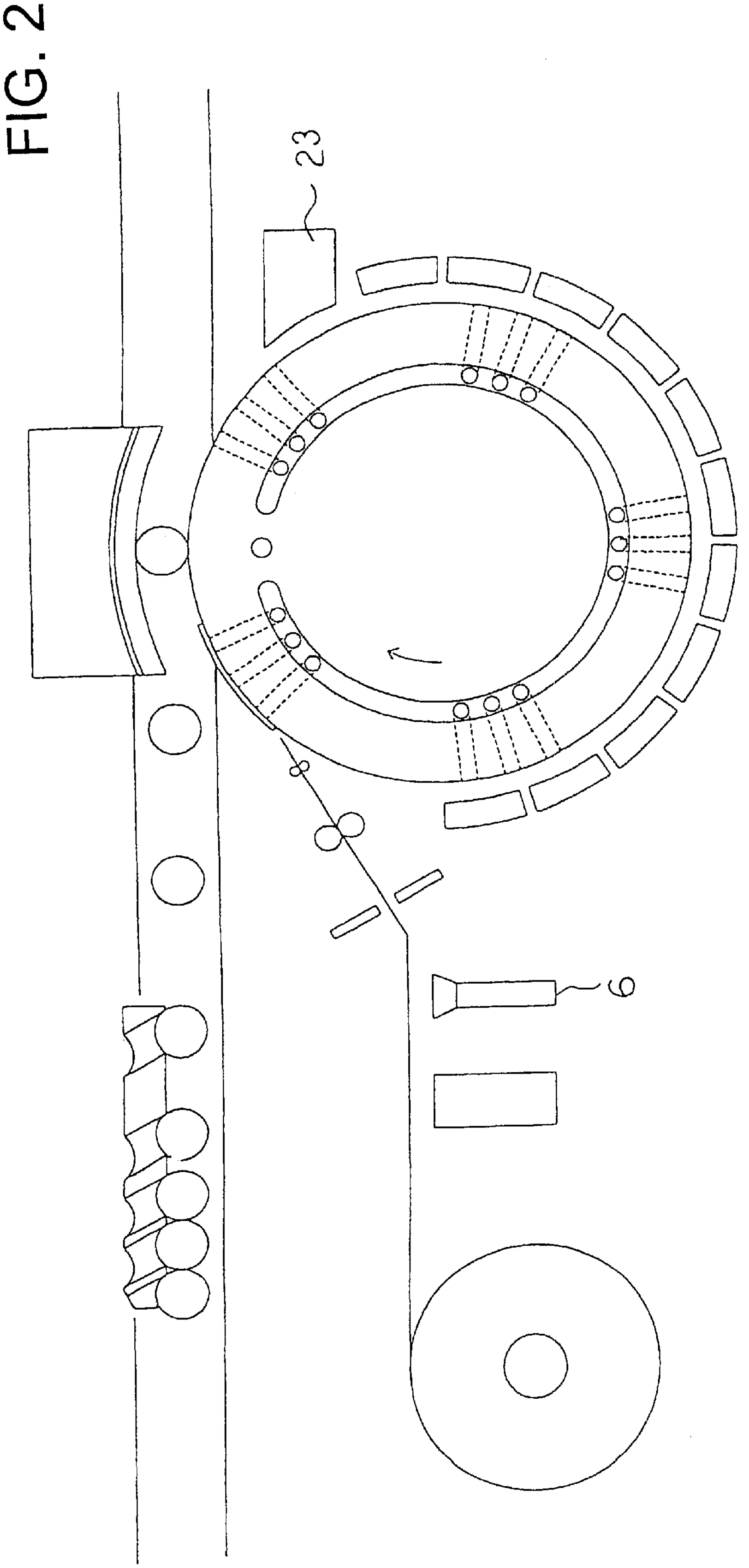
FIG. 2 is a view illustrating a failed printing label recovery tray provide in the labeler of the present invention.

FIG. 2 shows an example where a necessary item is printed in the surface of a label by the printer of FIG. 1, inspection is made to determine whether the print is accurate or not by the inspection unit 6. In order to recover the label in the failed printing label recovery tray when a failure is determined, a part of the far-infrared ray heater zone 13 is set as a failed printing label recovery device 23.

Figure 3:
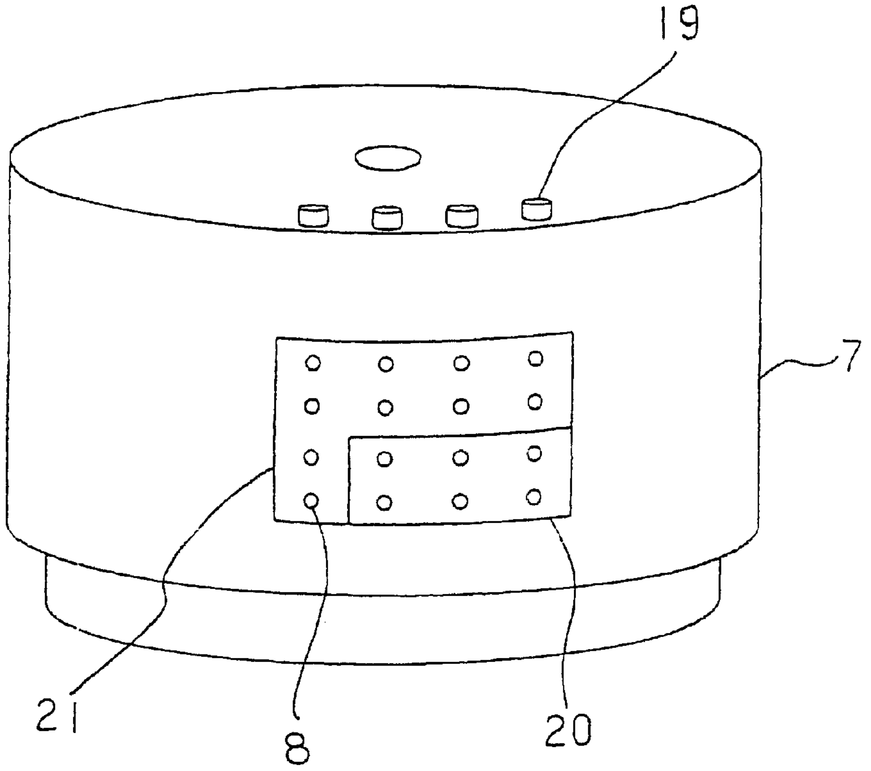
FIG. 3 is a view of an adhering drum.
Figure 4:
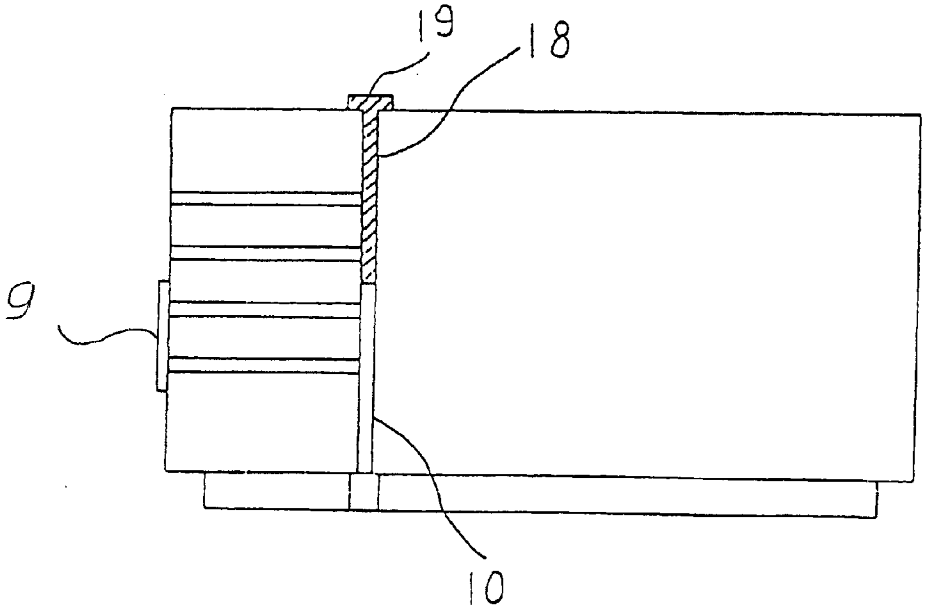
FIG. 4 is a sectional view of the adhering drum.

FIG. 3 shows an adhering drum according to the example of the present invention. As can be understood from a sectional view of FIG. 4, the label suction hole 8 is communicated with the ventilation path 10. One end of the ventilation path 10 is opened, while the other end is linked with a pressure-reducing device or decompresser (not shown).

A reference numeral 21 in FIG. 3 denotes a wide suction portion formed by suction holes disposed within a wide range of distribution corresponding to a large label. Numeral 20 denotes a narrow suction portion having suction holes disposed within a narrow range of distribution that matches a small label sucked in the embodiment. The numeral 21 is a suction portion for a large label.

According to this embodiment, there are four suction holes in the left most column, and these four suction holes are closed by a closing rod 18 having length equal to a distance between the top surface and the lowest end of the left most column, inserted from the ventilation path opening of the top surface. Two uppermost suction holes among those of the second column from the left are closed by another closing rod 18 having length equal to a distance between the top surface and the lower part of the second suction hole. The suction holes of the third column from the left and the right end column are similarly closed. A closed state is described by referring to FIG. 4. The closing rod 18 is inserted from the ventilation path opening of the top surface to the second suction hole form the upper side to close the suction holes, and the small label 9 is sucked by the remaining two suction holes.

Thus, by closing the suction holes of the adhering drum of FIG. 3, adhering process for labels with various sizes may be carried out according to necessity by a single adhering drum. The rod head 19 is located at the top surface.

Figure 5:
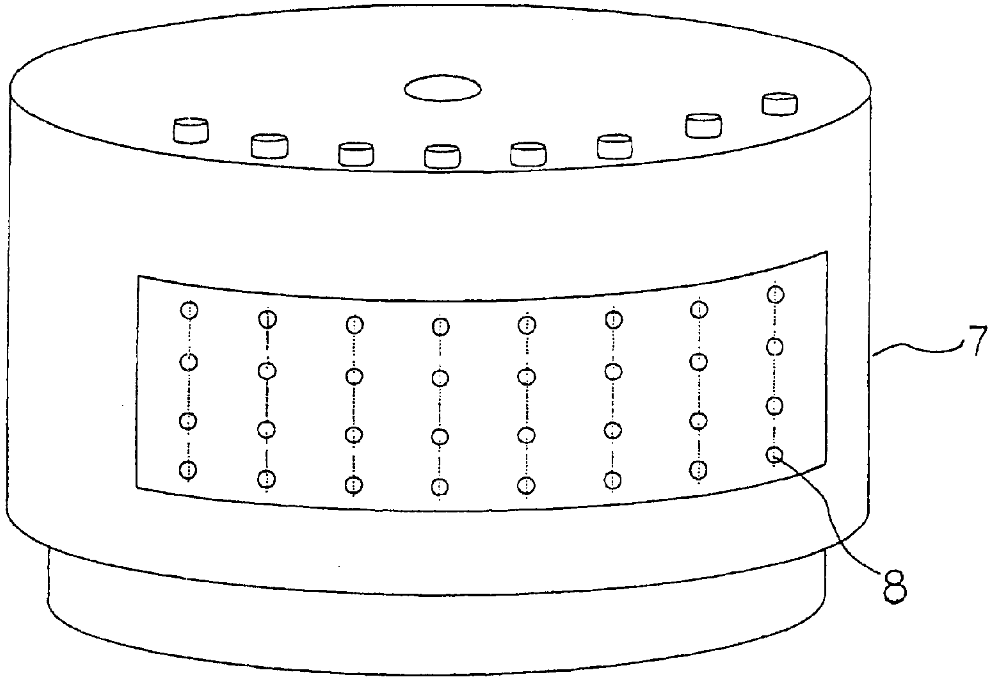
FIG. 5 is a view illustrating a large-size label sucked on the drum.

FIG. 5 shows another method of adjusting the suction holes of an adhering drum according to label size.

The adhering drum 7 includes suction holes 8 that match a large label of an A size.

Figure 6:
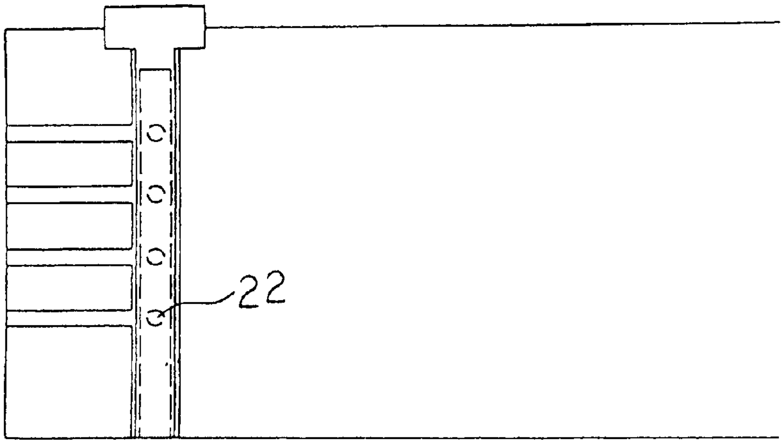
FIG. 6 is a view illustrating closing of a suction hole by using a hollow closing rod.

FIG. 6 shows a state where the closing rod 18 having a through-hole 22 that is provided in the hollow rod wall in matching with the suction hole of the largest label of an A size is inserted from the ventilation path opening of the drum. The ventilation path and the through-holes are matched with each other. Thus, by linking the ventilation path and the suction hole with each other according to the label of an A size, the label may be sucked.

Figure 7:
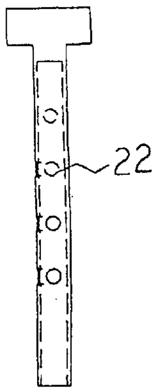
FIG. 7 is a view illustrating the hollow closing rod.

FIG. 7 shows an example where through-holes are provided in the rod wall of another surface of the closing rod in matching with the suction holes for a B size label, which is smaller than an A size label. This closing rod is inserted into the ventilation path, and the suction holes for the A size part, that is larger than the B size part, are closed when the ventilation path and the through-hole 22 are matched with each other. Accordingly, the label of a B size may be sucked.

Figure 8:
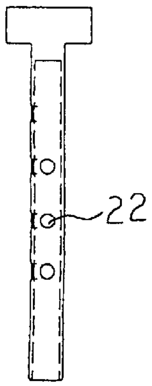
FIG. 8 is a view illustrating another hollow closing rod.

FIG. 8 shows an example where through-holes are provided in the rod wall of yet another surface of the closing rod in matching with the suction holes for a label smaller than a B size. This closing rod is inserted into the ventilation path, and the suction holes for large A and B size parts are closed when the through-hole 22 is matched with the ventilation path. Thus, the label of a C size may be sucked.

Figure 9:
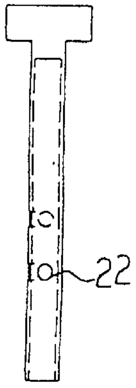
FIG. 9 is a view illustrating yet another hollow closing rod.

FIG. 9 shows an example where through-holes 22 are provided in the rod wall of further another surface of the closing rod in matching with the suction holes for a label of a D size that is smaller than a C size. This closing rod is inserted into the ventilation path, and the suction holes for the larger A, B and C sizes are closed when the through-hole 22 is matched with the ventilation path. Thus, the label of a D size may be sucked.

Figure 10:
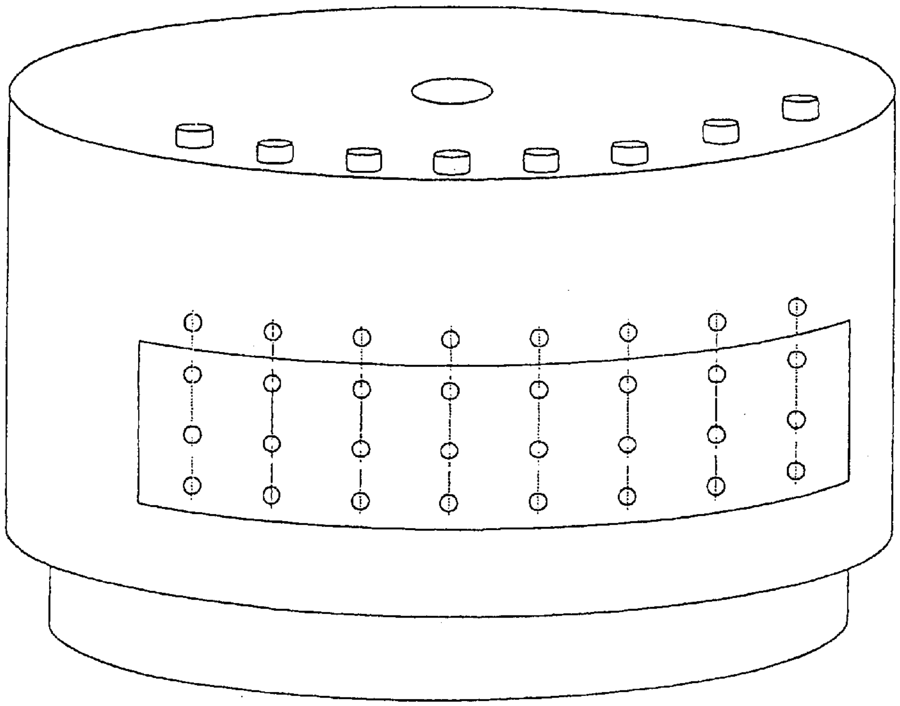
FIG. 10 is a view illustrating an oblong label sucked on the drum.
Figure 11:
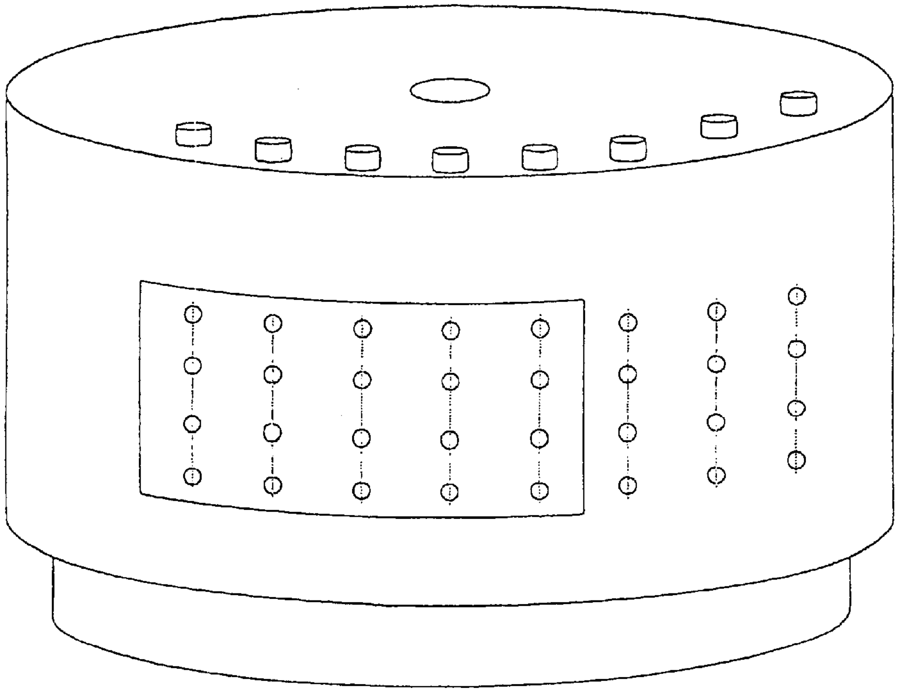
FIG. 11 is a view illustrating a label short sideways, sucked on the drum.

In addition, as shown in FIG. 10, suction holes at the upper most row may be closed to match a label that is long in horizontal direction but short in vertical direction. Alternatively, suction holes may be closed at end columns to match a label that is longer in the vertical direction but shorter in the horizontal direction as shown in FIG. 11.

Thus, a plurality of through-holes can be provided in matching with the suction holes in different sizes in the same hollow closing rod. However, plural kinds of closing rods may be provided, in which through-holes are provided in matching with the sizes of the respective labels.

The single drum labeler of the present invention, not using the suction drum, is advantageous in the following respects. The size of the device may be minimized. The labeling process may be shortened. The label activation device may be disposed substantially on the full surface of the adhering drum. The diameter of the drum may be reduced by setting the activation area long. The label adhering speed can be increased. The labels in different sizes can be processed by one drum by adjusting the sucking surface according to label size. An odd number of suction holes are arranged, and articles having labels adhered thereto are discharged at equal intervals by feeding every other label.

What is claimed is:

1. A single drum heat-sensitive adhesive activating labeler comprising:

(a) a label sheet;

(b) a printer for printing indicia on a surface opposite to an adhesive surface of the label sheet;

(c) a feed roll that feeds a label piece and is provided in front of the printer;

(d) a label sheet cutter disposed in front of the feed roll at a position where at least a tip of the label piece cut from the label sheet by the label sheet cutter is brought into contact with the suction hole of the adhering drum;

(e) a label adhering drum disposed in front of the label sheet cutter, having a plurality of groups of label suction holes disposed at equal intervals in an odd number of places around a peripheral surface of the label adhering drum, and a ventilation hole having an open hole at one end opened to a top surface of the label adhering drum and another end connected to a pressure reducing device, the ventilation hole and the groups of label suction holes being in communication with each other, and a closing rod freely detachably inserted from the opening of the ventilation hole at the top surface to close at least one unnecessary label suction hole;

(f) a feeder that feeds an article, to which the label piece is adhered, in synchronization with the label piece sucked to a label suction hole of the every other position;

(g) a pressing device provided at a position opposite to the label adhering drum in front of the cutter to press the article fed to the adhering drum and adhere the label piece according to rotation of the drum; and (h) a heat-sensitive adhesive activation device to adhere the label piece onto the article, disposed along the peripheral surface of the label adhering drum except locations where the label adhering drum initially sucks the label piece onto the label adhering drum and where the article is pressed onto the label adhering drum wherein the feed roller feeds the label piece to a selected suction hole being at every other interval.

2. A single drum heat-sensitive adhesive activating labeler according to claim 1, wherein each one of the groups of label suction holes includes a plurality of suction holes.

3. A single drum heat-sensitive adhesive activating labeler according to claim 1, wherein the label sheet cutter includes a latch and a cutting blade.

4. A single drum heat-sensitive adhesive activating labeler according to claim 1, the label sheet cutter includes a rotary blade and a rotary roller.

5. A single drum heat-sensitive adhesive activating labeler according to claim 1, wherein the label suction holes are disposed in odd number of places around the peripheral surface of the label adhering drum and include wide suction portions for sucking large label pieces.

6. A single drum heat-sensitive adhesive activating labeler according to claim 1, wherein the closing rod freely detachably inserted into the open hole to close at least one unnecessary label suction hole and has a length reaching a suction hole of a lowermost layer from the open hole.

7. A single drum heat-sensitive adhesive activating labeler according to claim 1, wherein the closing rod has a head that is large enough not to be inserted into the open hole.

8. A single drum heat-sensitive adhesive activating labeler according to claim 1, wherein the closing rod includes an adjustable portion length of insertion of the closing rod from the open hole is adjustable.

9. A single drum heat-sensitive adhesive activating labeler according to claim 1, wherein the closing rod comprises a hollow part with a wall, the wall includes a through-hole at a position that matches the suction hole, the hollow part further has an opening end that is communicated with a ventilation path.

10. A single drum heat-sensitive adhesive activating labeler according to claim 9, wherein the closing rod includes a plurality of through-holes that match suction holes suited for a label size.

11. A single drum heat-sensitive adhesive activating labeler according to claim 1, wherein the pressure reducing device is connected to the label suction holes of the drum, and stops suction at a stage where the article is pressed to the label adhering drum, and the label piece is adhered to the article by rotation of the drum.

12. A single drum heat-sensitive adhesive activating labeler according to claim 1, wherein the heat-sensitive adhesive activation device is a far-infrared ray heater adapted to activate heat-sensitive adhesive of the label by radiant heat of far-infrared rays without contact.

13. A single drum heat-sensitive adhesive activating labeler according to claim 1, wherein the pressing device comprises an arc shaped pressing member provided along the peripheral surface of the label adhering drum to guide the fed-in article to the label adhering drum and press the article by rotation of the label adhering drum.

14. A single drum heat-sensitive adhesive activating labeler according to claim 1, wherein a failed printing label adhered article detecting and discharging device is provided in a position in front of the pressing device.

15. A continuous label adhering method by a single drum heat-sensitive adhesive activating labeler, comprising the steps of:

sucking the label piece with a label suction hole of a single drum heat-sensitive adhesive activating labeler specified in any one of claims 1 to 14;

activating an adhesive on a surface of the label piece by a heat-sensitive adhesive activation device;

adhering the label piece to the article fed by the pressing device, to which the label is to be adhered;

rotating the label suction hole once without having the label piece;

returning to a label sucking position to suck another label piece;

repeating the steps of sucking the another label piece, activating adhesive of the another piece by the heat-sensitive adhesive activation device, and adhering the another label piece to another article fed by the pressing device, to which the another label piece is to be adhered.

16. A single drum heat-sensitive adhesive activating labeler, comprising:

(a) a label sheet having a printing surface and an opposite adhesive surface having a heat-sensitive adhesive applied thereto;

(b) a printer for printing indicia on the printing surface of the label sheet;

(c) a label adhering drum having a peripheral surface, an odd number of groups of label suction holes disposed at equal intervals about the peripheral surface, a ventilation hole having one end opened to a top surface and the other end connected to a pressure reducing device with the ventilation hole and the groups of label suction holes being in communication with each other, and a closing rod freely detachable and operative to enter from an open hole bored in the top surface to close at least one unnecessary label suction hole;

(d) a feed roll for feeding a label piece to one of the groups of suction holes at every other interval;

(e) a label sheet cutter for cutting the label sheet into individual ones of label pieces and operative for providing each one of the label pieces into contact with a selected one of the groups of the label suction holes;

(f) a feeder for feeding in an article, to which a label piece is to be adhered, to the label adhering drum in synchronization with the label piece being sucked by a selected group of label suction holes at every other interval;

(g) a pressing device for pressing the fed-in article onto the label piece as the label adhering drum rotates; and (h) a heat-sensitive adhesive activation device disposed substantially around the label adhering drum to activate the sheet-sensitive adhesive on the label piece so that the article can be pressed onto the label piece to cause the label piece to be stuck to the fed-in article.

* * * * *